Figure 1:
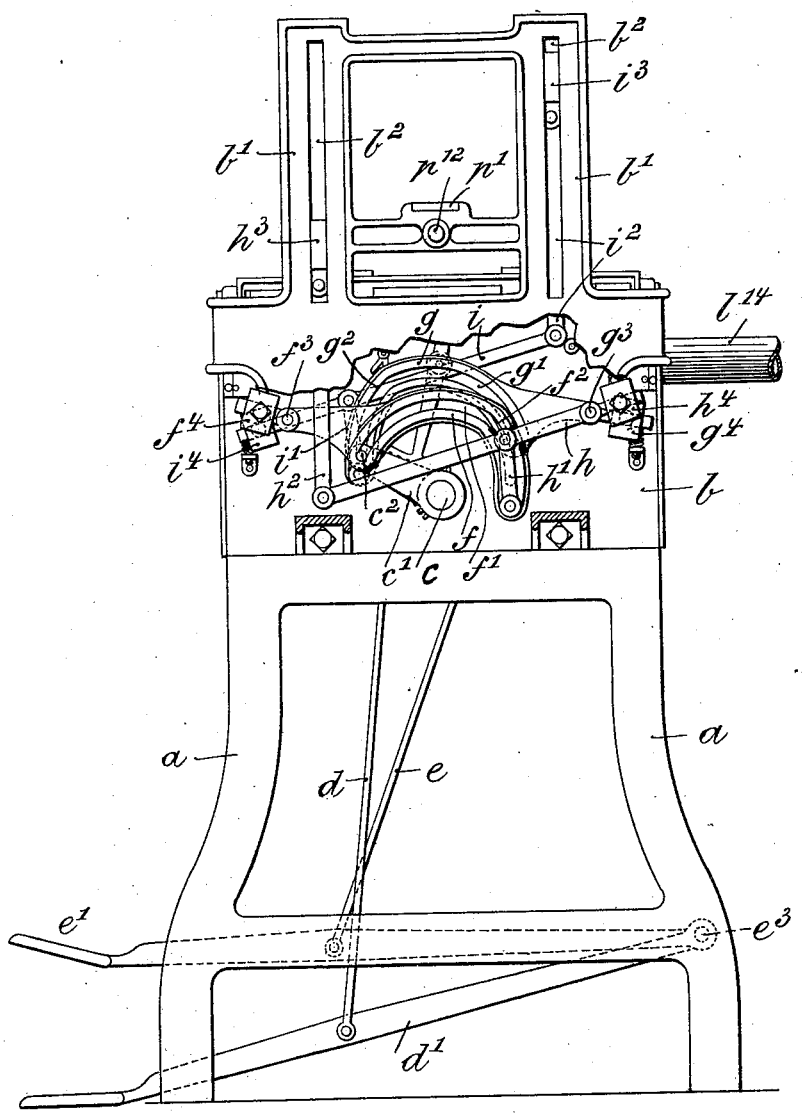

(No Model.)

9 Sheets—Sheet 1.

A. D. FENWICK.
MACHINE FOR FOLDING AND PRESSING COLLARS AND CUFFS.

No. 563,950.  Patented July 14, 1896.

Witnesses:
Thomas M. Smith.
Richard C. Maxwell.

Inventor.
Albert D. Fenwick,
by J. Walter Douglas
Attorney.

(No Model.) 9 Sheets—Sheet 2.

A. D. FENWICK.
MACHINE FOR FOLDING AND PRESSING COLLARS AND CUFFS.

No. 563,950. Patented July 14, 1896.

Witnesses:
Thomas M. Smith
Richard C. Maxwell

Inventor:
Albert D. Fenwick,
By J. Walter Douglass
Attorneys.

(No Model.) 9 Sheets—Sheet 3.
A. D. FENWICK.
MACHINE FOR FOLDING AND PRESSING COLLARS AND CUFFS.
No. 563,950. Patented July 14, 1896.
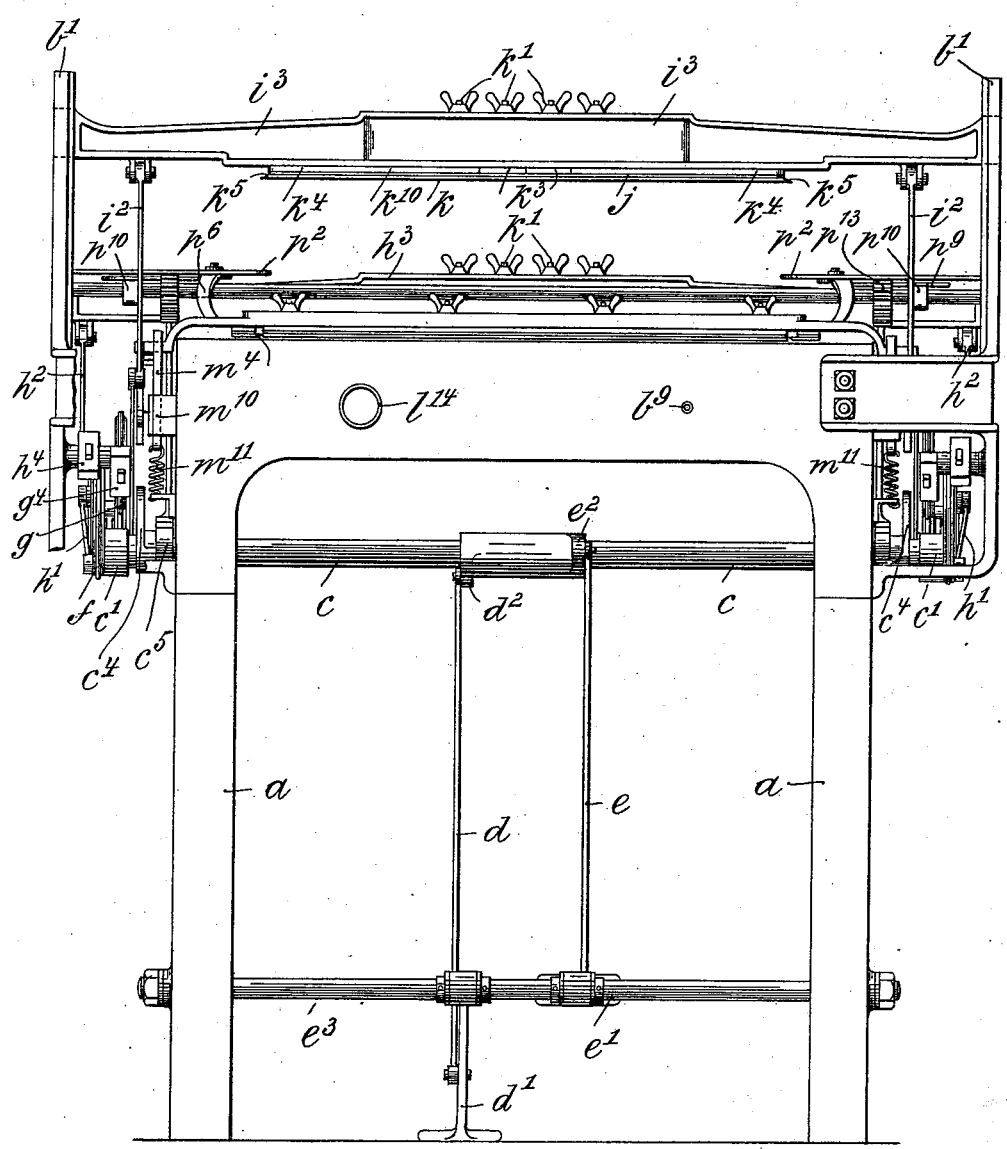

(No Model.) 9 Sheets—Sheet 4.
A. D. FENWICK.
MACHINE FOR FOLDING AND PRESSING COLLARS AND CUFFS.
No. 563,950. Patented July 14, 1896.
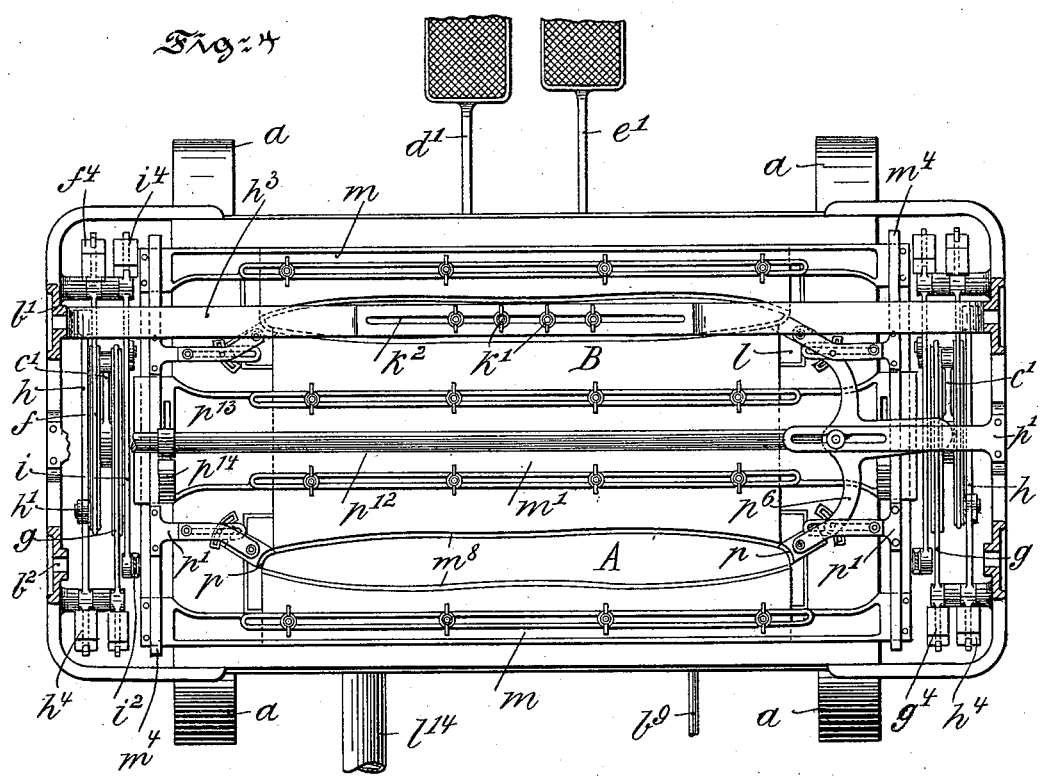
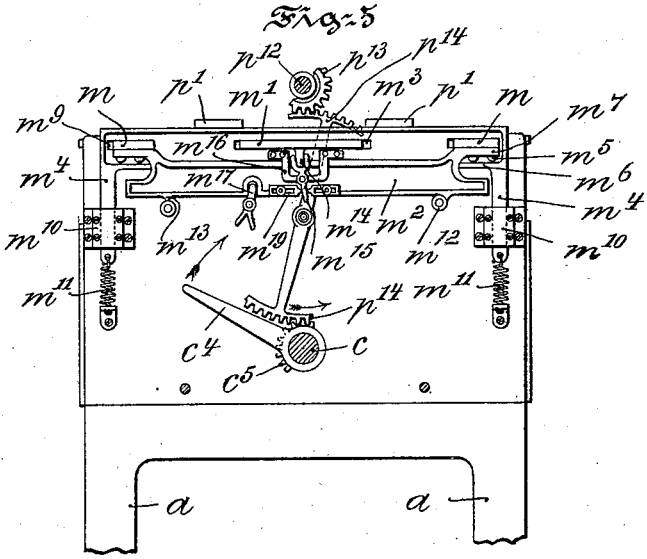

(No Model.) 9 Sheets—Sheet 5.
A. D. FENWICK.
MACHINE FOR FOLDING AND PRESSING COLLARS AND CUFFS.
No. 563,950. Patented July 14, 1896.
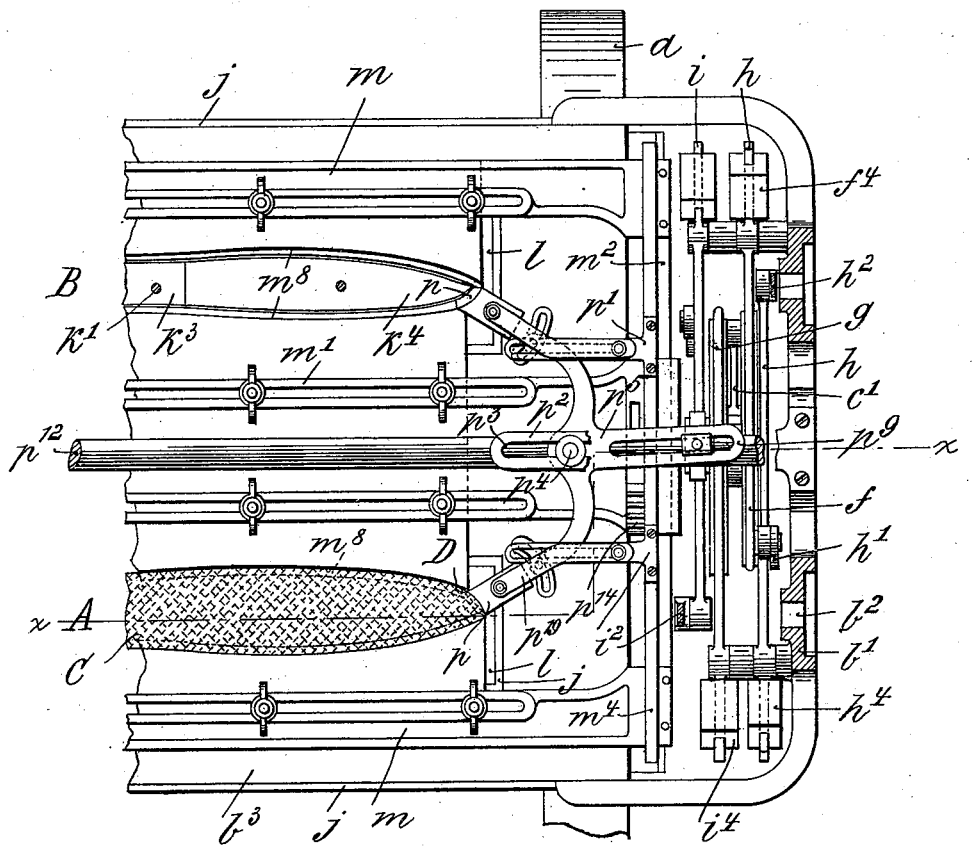
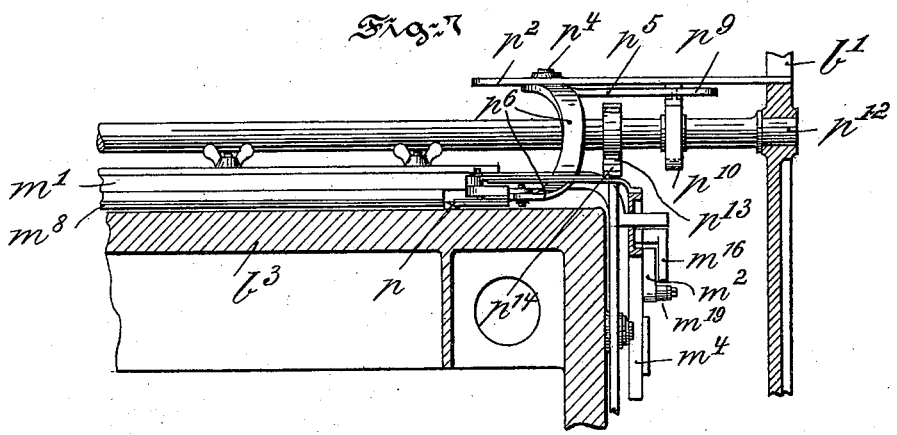
Witnesses:
Thomas M. Smith.
Richard C. Maxwell.
Inventor.
Albert D. Fenwick,
By J. Walter Douglass
Attorney.

(No Model.) 9 Sheets—Sheet 6.
A. D. FENWICK.
MACHINE FOR FOLDING AND PRESSING COLLARS AND CUFFS.
No. 563,950. Patented July 14, 1896.

Witnesses:
Thomas M. Smith
Richard C. Maxwell

Inventor
Albert D. Fenwick
By J. Walter Douglass
Attorneys (No Model.) 9 Sheets—Sheet 7.
A. D. FENWICK.
MACHINE FOR FOLDING AND PRESSING COLLARS AND CUFFS.
No. 563,950. Patented July 14, 1896.
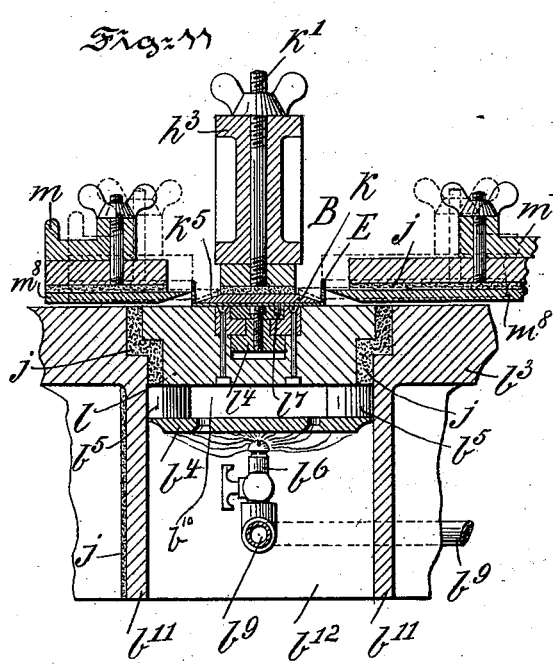
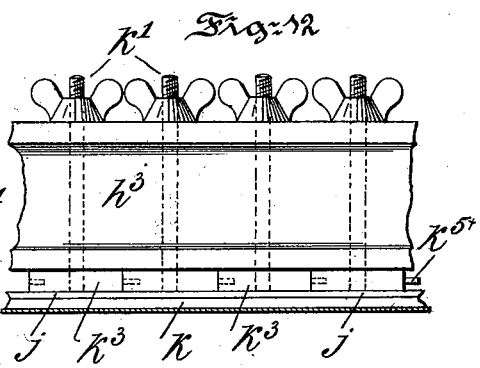
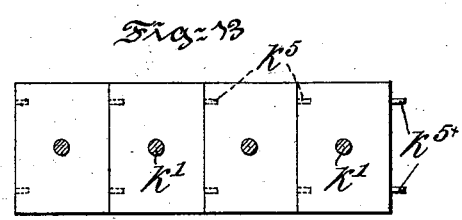
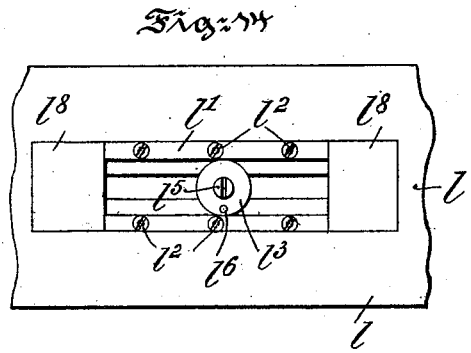
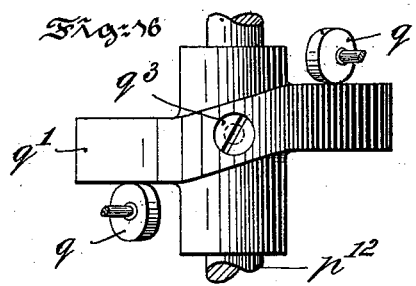
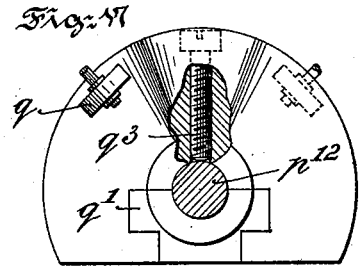
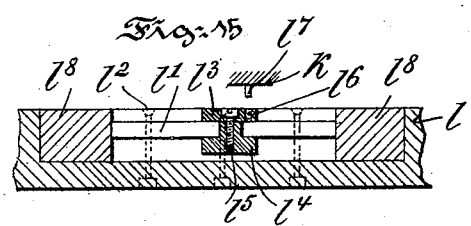
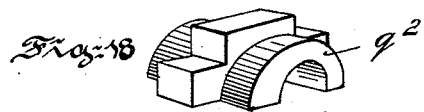
Witnesses:
Thomas M. Smith.
Richard C. Maxwell.
Inventor.
Albert D. Fenwick,
By J. Walter Douglas
Attorney.

(No Model.) 9 Sheets—Sheet 8.
A. D. FENWICK.
MACHINE FOR FOLDING AND PRESSING COLLARS AND CUFFS.
No. 563,950. Patented July 14, 1896.
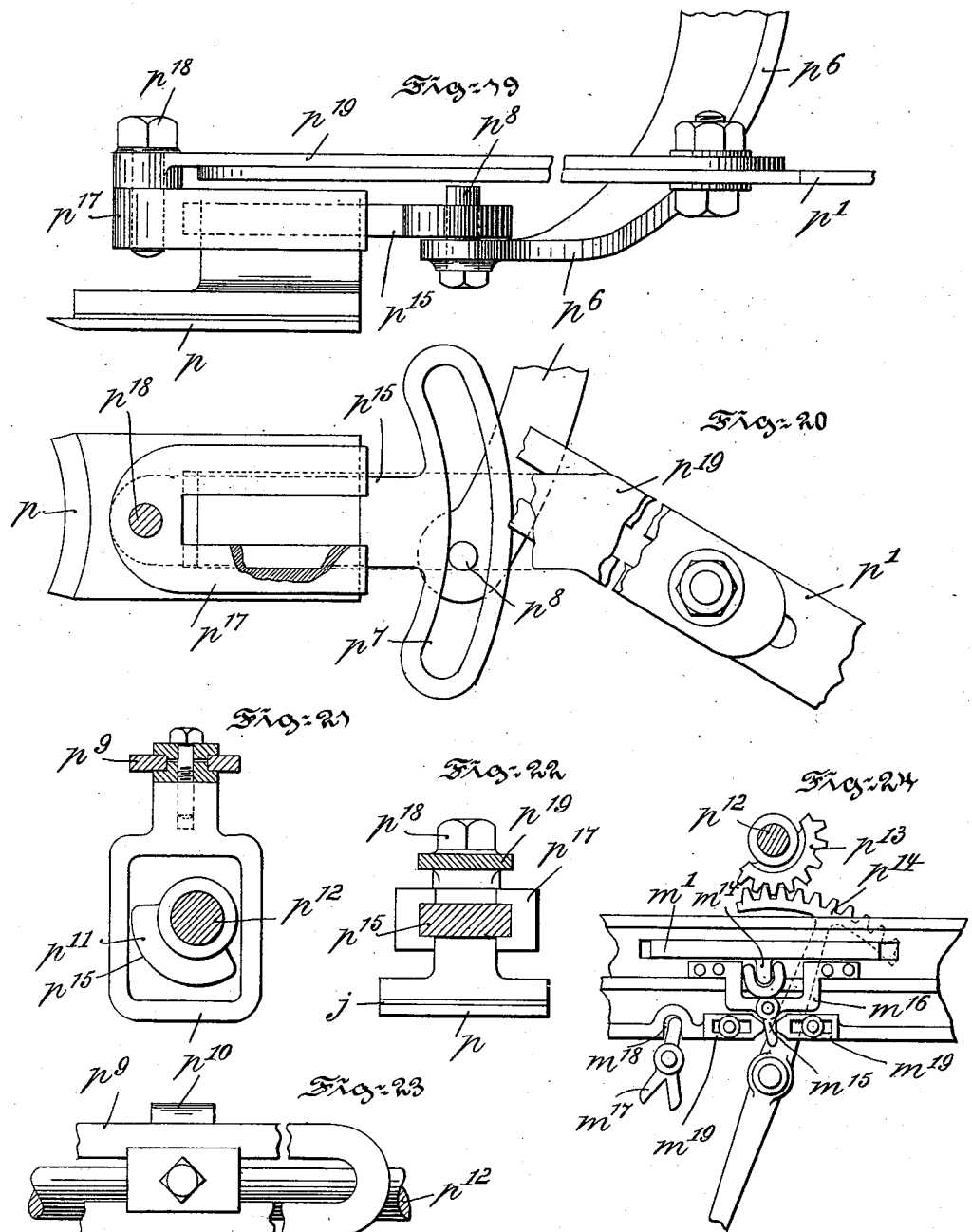

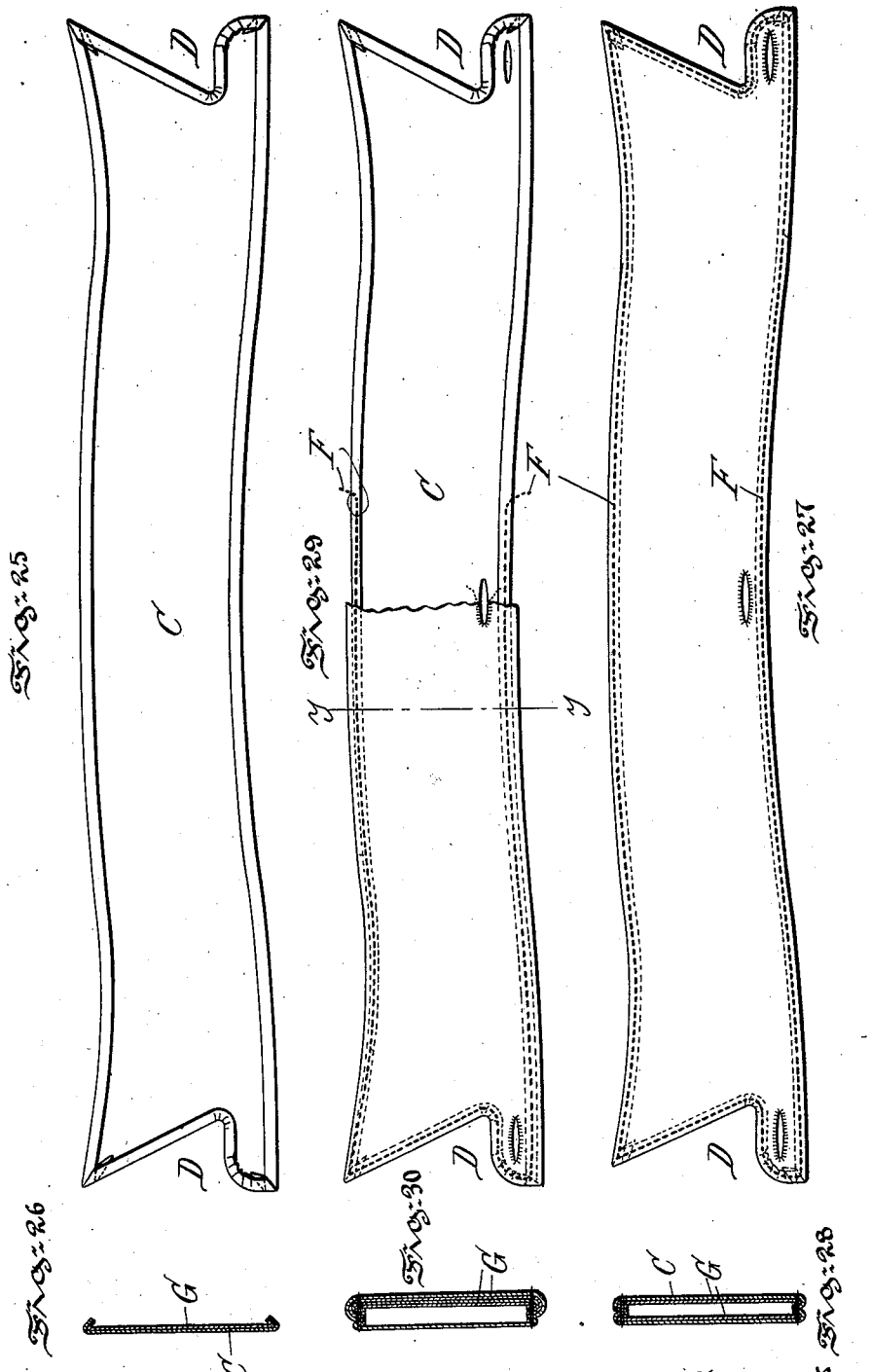

UNITED STATES PATENT OFFICE.

ALBERT D. FENWICK, OF PHILADELPHIA, PENNSYLVANIA, ASSIGNOR, BY DIRECT AND MESNE ASSIGNMENTS, TO THE FENWICK COLLAR AND CUFF MACHINE COMPANY, OF SAME PLACE.

MACHINE FOR FOLDING AND PRESSING COLLARS AND CUFFS.

SPECIFICATION forming part of Letters Patent No. 563,950, dated July 14, 1896.

Application filed January 30, 1895. Serial No. 536,645. (No model.)

*To all whom it may concern:*

Be it known that I, ALBERT D. FENWICK, a citizen of the United States, residing at the city of Philadelphia, in the county of Philadelphia and State of Pennsylvania, have invented certain new and useful Improvements in Machines for Forming, Turning, and Pressing Collars, Cuffs, and Analogous Articles, of which the following is a specification.

My invention relates to machines for forming, turning, and pressing blanks for collars, cuffs, and analogous articles; and it has for its object to provide a mechanism simple in construction and efficient in operation, whereby the required edges of a collar-blank are relatively folded with accuracy and precision.

In the present instance the invention is shown as embodied in a machine employing two dies and two matrices, wherein each die and its matrix are operated with relation to each other and to the other die and its matrix; and wherein, further, a die and its matrix are held, by the operation of the mechanism, in "closed-in" position for a time to set or fix the folded edges of a blank being operated on before, by the further or continued operation of said mechanism, the said die and matrix can be separated.

My invention is set forth in the following description, and is particularly pointed out in the claims.

Figure 2:
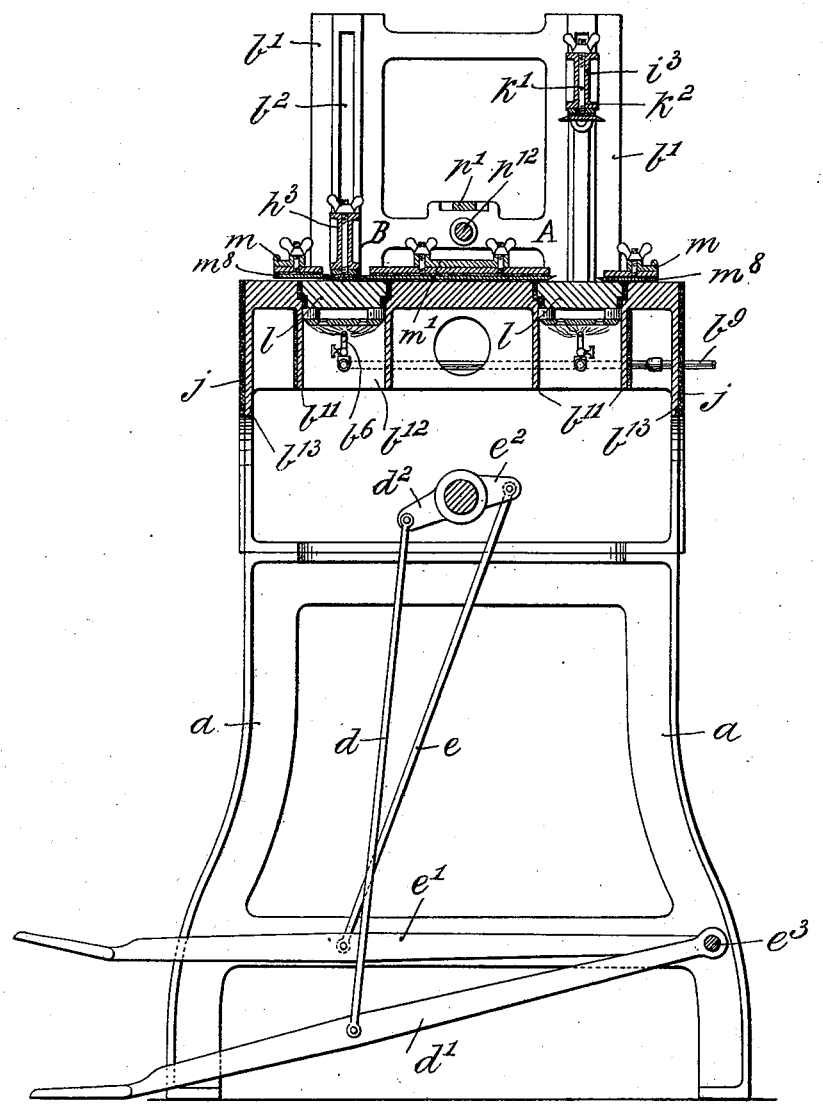
Figure 8:
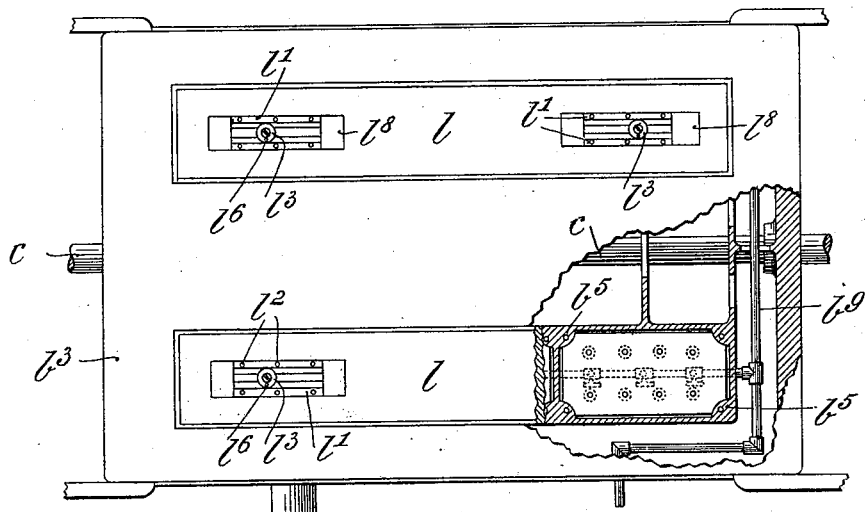
Figure 9:
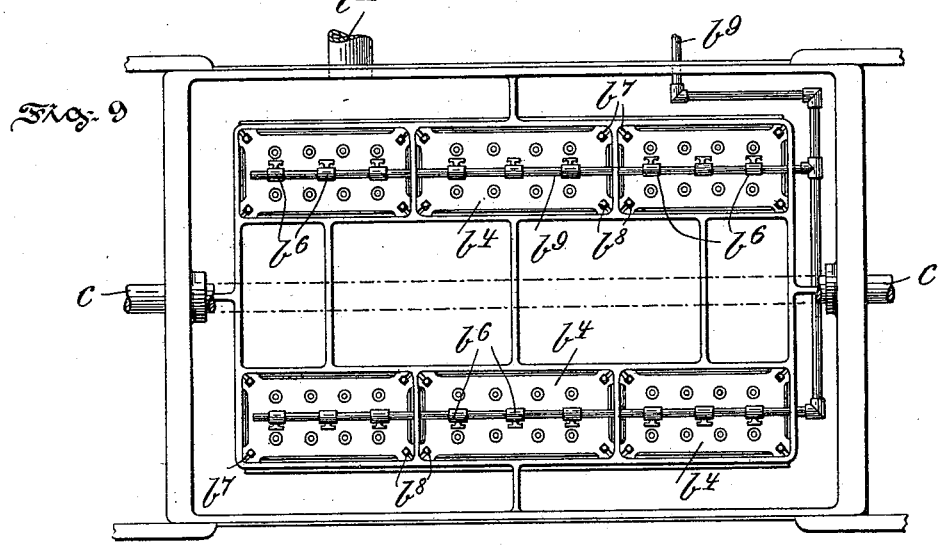
Figure 10:
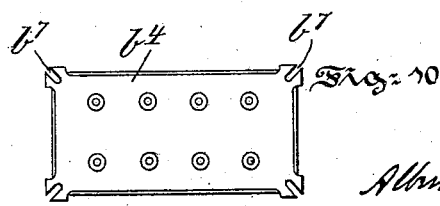

Figure 1 is a side elevation of a machine embodying the main features of my invention, a portion of the frame being broken away to show more clearly the mechanism for raising and lowering die-plates thereof. Fig. 2 is a vertical central section of the machine, showing the mode of heating the base of the matrix for the blanks. Fig. 3 is a rear end elevation of the machine, illustrating the mechanism for elevating and lowering the dies and also for vertically and longitudinally moving the side walls of the matrix of the machine. Fig. 4 is a top or plan view of the machine, illustrating the dies, matrix, and corner-knives and mechanism for operating the same. Fig. 5 is an end elevation of the machine, certain parts being removed to illustrate the mechanism, whereby the corner-knives are vertically, and the side walls of the matrix vertically and longitudinally, moved. Fig. 6 is an enlarged view of one end of Fig. 4, illustrating in detail the mechanism for controlling the side walls of the matrix and the corner-knives. Fig. 7 is a vertical sectional view on the line $x\,x$ of Fig. 6. Fig. 8 is a top or plan view of the heated bases of the matrices and of the bed of the machine, a portion of the bed being broken away to expose to view the interior thereof. Fig. 9 is an underneath plan view of the bed, illustrating the mode of heating the base of the matrix. Fig. 10 is an underneath plan view of one of the plates interposed between the gas-flame and the matrix-base. Fig. 11 is an enlarged vertical central section of one of the matrices and the die, showing the position of the blank and of the side walls of the matrix with the die in the matrix. Figs. 12 and 13 are views illustrating, respectively, in side elevation and plan the die-frame and the removable die-plates and the manner in which the said plates may be secured together or removed, so that the length of the die may be adjusted. Figs. 14 and 15 are enlarged views illustrating, respectively, in top or plan and central longitudinal section, the base of the matrix and the adjustable button and pin engaging a recess therein for marking points for uniting the body and neckband of a two-part or turn-down collar. Figs. 16, 17, and 18 are detail views of a modified form of mechanism, for operating longitudinally the corner-knives of the machine. Figs. 19 to 23 are enlarged views illustrating in side elevation, top or plan, and section details of the corner-knives and their accessories or connections. Fig. 24 is an enlarged detail of a portion of Fig. 5, illustrating the mechanism for longitudinally moving the side walls of the matrix. Figs. 25 and 27 are side elevations, respectively, of a blank and finished collar adapted to be made in a machine of my invention and by a method more fully hereinafter described, the said finished collar being provided with a gutter edge. Figs. 26 and 28 are central vertical sections of, respectively, Figs. 25 and 27. Fig. 29 is a side elevation of a collar having a beaded edge and partly broken away to expose the under blank, the said collar being adapted to be made by a method and in a machine of my invention; and Fig. 30 is a vertical section on the line $y\,y$ of Fig. 29.

Referring to the drawings, $a$ represents the main frame or support for the machine, and $b$, the body-frame or table supported thereon. The body-frame $b$ is provided with upwardly-extending end frames $b'$ and $b'$, which are grooved, slotted, or channeled as at $b^2$, for a purpose to be hereinafter explained. The main shaft $c$ is journaled in the body or table-frame $b$, and is connected by means of arms $d^2$ and $e^2$, with the treadle-rods $d$ and $e$, of suitable treadles $d'$ and $e'$, pivoted to the shaft $e^3$, which is supported in the main frame $a$ of the machine. With reference to Fig. 1, the main shaft $c$ is afforded an oscillating movement through the arms $d^2$ and $e^2$, when the treadles $d'$ and $e'$ are operated, and it is provided with a crank-arm $c'$, carrying the crank-pin $c^2$, which engages in suitable slots $f'$ and $g'$ of the oppositely-arranged cams $f$ and $g$, which are each respectively pivoted as at $f^3$ and $g^3$ to the frame $b$. The cams $f$ and $g$ have at their free ends a throw-surface, as at $f^2$ and $g^2$, and an idle surface from said throw toward the pivot. The throw-surface of the cam $g$ is opposite the idle surface of the cam $f$, and vice versa. Pivoted at the throw end of the cams by means of links $h'$ and $i'$ are rods or levers $h$ and $i$. The rods $h$ and $i$ are pivoted at one end in the points of pivotal support for the cams $f$ and $g$. These rods $h$ and $i$ are parallel with each other at certain intervals of their movement, and are connected by means of the links $h^2$ and $i^2$ with the frames $h^3$ and $i^3$, carrying the dies as hereinafter explained. On the ends of the cams are arranged suitable counterweights $f^4$ and $g^4$ to counterbalance the weight thereof, and upon said rods $h$ and $i$, are also arranged similar counterpoising-weights $h^4$ and $i^4$.

The construction and operation of the cams $f$ and $g$ and of the rods $h$ and $i$ and of the connections between said rods and the frames $h^3$ and $i^3$ are such that, supposing the arm $c'$ of the shaft $c$ to move from left to right, the arm $h$, operated by the cam $f$, will remain fixed, while the pin $c^2$ of the arm $c'$ is traversing the slot in the cam $f$ to the point where the throw thereof begins. At the same time the pin $c^2$ is traversing the throw portion of the cam $g$, and thereby throws the cam $g$ in a downward direction. The arm $i$ is depressed by the said cam $g$, and carries with it the rod $i^2$ and frame $i^3$. At the moment the pin of the arm $c'$ reaches the throw portion of the cam $f$, the cam $g$ has been thrown, and the pin of the arm $c'$ has traversed for a certain length of time the idle portion of the cam $g$. Consequently there will be no movement to the frame $i^3$ nor the frame $h^3$, both remaining fixed, one in a depressed and the other in an elevated position. As the pin $c'$ reaches the throw of the cam $f$, and traverses the same the arm $h$ is raised and carries with it the rod $h^2$ and the frame $h^3$, thereby elevating the frame $h^3$ into its highest position, and at the same time the frame $i^3$, by reason of the farther travel of the pin $c'$, in the idle portion of the cam $g$, remains stationary. The lever-arm $h$, and also the lever-arm $i$, are counterpoised by weights $h^4$ and $i^4$, so that the cams $f$ and $g$, turning on their pivots, easily and quickly operate the arms $h$ and $i$. In the same manner the cams $f$ and $g$ are counterweighted at $g^4$ and $f^4$, so that the pin of the crank-arm $c'$ can afford an easy and quick movement to the cams about their pivotal connections. It will be seen that the frame $h^3$, for instance, when lowered remains for a certain length of time in its lowered position, that is, while the pin $c'$, through the oscillation of the shaft $c$ by the rod $e$, treadle $e'$, and arm $e^2$, is traveling in the idle portion of the cam $f$, and when raised by the treadle $d'$, rod $d$, and arm $d^2$, oscillating the shaft $c$, the said frame remains also in a raised position for a certain length of time without movement. The same is true of the frame $i^3$. By this arrangement, when anything is carried by the frames $h^3$ and $i^3$, as, for instance, a die $k$, the said die will be lowered and pressed for a certain length of time upon a surface and then will be moved upward and remain at rest in the upward position, while the die $k$, carried by the frame $i^3$, makes a reverse movement, that is, when one is raised the other is stationary and then lowered, and vice versa. The frame $i^3$ or $h^3$ is provided on its under surface with a plate or series of plates $k^{10}$, carrying the die $k$, the construction of which will be better understood by reference to Figs. 1, 11, 12, and 13 of the drawings. This plate or die-carrier $k^{10}$, as shown, consists, preferably, of six, more or less, parts united to the frame by means of bolts and screws $k'$, passing through a slot $k^2$, in the frame $h^3$ or $i^3$, and engaging the top surface of the sections of the die-plate $k^{10}$. The center portions $k^3$ of this plate $k^{10}$ are removable one from the other by means of the dowel-pins $k^{5\times}$, substantially in the manner illustrated in Figs. 12 and 13, so that the width or length of the plate $k^{10}$ may be adjusted.

The bolts and screws carrying the plate-sections are longitudinally adjustable in a groove or slot $k^2$ of the frame $i^3$ or $h^3$, so that the end sections or pieces $k^4$, which, by preference, are never entirely removed from the frame, can be slid longitudinally toward or away from each other to admit of the interposition of one or more center portions $k^3$, as fully illustrated in Fig. 4. This longitudinal adjustment is to vary the length of the die-carrier $k^{10}$, according to the length of the die $k$, which varies with the different lengths of blanks to be formed, as will be hereinafter more fully explained.

The die-carrier $k^{10}$ is separated from the die $k$ by a layer of asbestos or other suitable heat-non-conducting material $j$, for a reason hereinafter more particularly mentioned. The edges of the die $k$ are preferably beveled as at $k^5$.

The frame $b$ of the machine is provided with a bed or table $b^3$, into which is set directly beneath the die-plates stone or other suitable heat-conducting slabs $l$, which slabs are adapted to form a base to support the die $k$, when in its lowest position, and upon each base $l$ a blank is adapted to rest, when a frame and its die are lowered and pressed down thereon. I prefer to make this base of soapstone, because while it is easily heated it does not scorch when pressed against a fabric to be treated. This base $l$ is likewise separated from the bed of the body-frame by means of a layer of asbestos or non-conducting material $j$, substantially as illustrated in Fig. 11. Beneath the base $l$, and secured to suitable brackets $b^5$, of the frame $b$, are perforated iron plates $b^4$, adapted to be heated by gas or other jets $b^6$. The mode of adjustment of these plates $b^4$ to the bracket $b^5$, to allow for warping and expansion under heat and cold, is illustrated particularly in Figs. 9 and 10, wherein the corners of these plates $b^4$ are slotted as at $b^7$, and adapted to receive a bolt $b^8$, which secures them directly to the bracket $b^5$. Beneath the plates $b^4$ are placed gas, steam, or other heating jets $b^6$, connected by a pipe $b^9$ with a suitable source of heat. The flame from these jets, while it will heat the iron plates $b^4$, does not impinge on the base $l$, being separated therefrom by an air compartment or chamber $b^{10}$, as illustrated in Fig. 11.

With reference to Figs. 5 and 24, above the bed $b^3$, and arranged at each end of the machine, are the plates $m$ and $m'$, forming, respectively, the side walls of two matrices A and B, the center plate $m'$ forming the inner walls of said matrices and the two end plates the outer walls thereof. These plates $m$ and $m'$ carry on their under surface a die $m^8$, having a knife-like edge projecting inward toward the center of each matrix. The bevel of the dies $m^8$ and the bevel $k^5$ of the die $k$ are parallel, so that said dies $k$ and $m^8$ may overlap each other when brought into engagement. The plates $m$ are secured to the carriages $m^2$, and in conjunction therewith have a longitudinal movement across the face of the bed-plate $b^3$, while the plate $m'$ is supported in a slot $m^3$ in a vertically-movable bracket $m^4$, and is longitudinally movable in the slot $m^3$. The carriage $m^2$ is supported, by means of rollers $m^5$, on a rail or ledge $m^6$ of said bracket $m^4$, and has a sliding or longitudinal movement on said bracket.

The ends of the plates $m$ are secured to arms $m^7$ of the carriage $m^2$, and said plates are also guided in slots $m^9$ in the bracket $m^4$. The bracket $m^4$ is vertically movable in guides $m^{10}$, secured to the frame $b$, and is normally held under the downward pressure of the springs $m^{11}$, and the connection between the carriage $m^2$ and bracket $m^4$ is such that the carriage may slide longitudinally on the bracket, but is elevated or depressed with the bracket $m^4$. The lower face of the carriage $m^2$, which slides on the rollers $m^{12}$, is secured in the frame $b$, and near either end of said carriage are provided cams or lugs $m^{13}$, adapted when brought over the rolls $m^{12}$ to slightly elevate one end of said carriage and one end of said bracket $m^4$ against the force of one of the springs $m^{11}$. Thus by the employment of the lugs $m^{13}$ in connection with the rolls $m^{12}$, vertical movement is imparted to either end of the carriage $m^2$, which is transferred through the bracket $m^4$ to the side and end walls of the matrix by reason of the fact that the plates $m$ engage the slots $m^9$. One of the end plates $m$ and one side of the middle plate $m'$ is thereby alternately elevated and depressed. The middle plate $m'$ receives its longitudinal movement in the slot $m^3$ in the following manner: Depending from the ends of said plate $m'$ is a lug $m^{14}$, engaged by the fork of an arm or trigger $m^{15}$, which is pivoted to a yoke $m^{16}$, secured to the bracket $m^4$. The arm or trigger $m^{15}$ is shifted back and forth by the longitudinal motion of the carriage $m^2$ through the adjustable stop-pins $m^{19}$, secured to the carriage and operating against the free end of the trigger $m^{15}$. The carriage $m^2$ is shifted by means of the trigger $m^{17}$, pivoted in the frame $b$, and having a finger engaging a slot $m^{18}$ in the carriage. The forked end of the trigger $m^{17}$ is adapted to be moved by an arm $c^4$, secured to the shaft $c$, which arm $c^4$ during the oscillation of the shaft is adapted to strike one or the other of the forks of the trigger $m^{17}$, and through its finger to shift the carriage reversely to the line of motion of the shaft $c$. The carriage $m^2$ in its motion shifts the plate $m'$ in a reverse direction to that of its own motion through the trigger $m^{15}$ and the stop-pins $m^{19}$. It will thus be seen that when the carriage $m^2$, carrying plates $m$, travels from left to right, the plate $m'$ travels from right to left, and the travel of the carriage from right to left causes the plate $m'$ to move from left to right, and therefore the plates $m$ and $m'$ will either move away from or toward each other. The plates $m$ and $m'$ are preferably made up of separate sections similar to the plate-sections carrying the die $k$, so that when the die-plates $m^8$ are changed to fold a longer or shorter blank the supporting-plates $m$ and $m'$ may be correspondingly lengthened or shortened.

The dies $m^8$ of the side plates $m$ and the center plates $m'$ are adapted, as hereinafter described, in conjunction with the die $k$, to form a folded edge at the sides of the collar-blank, but not to fold down the corner or ends of the blanks. To accomplish this is provided at either end of the matrix A or B a plate or knife $p$, which is vertically and longitudinally movable with respect to the base $l$ of the matrix, and also longitudinally and otherwise adjustable with respect to the plates $m$ and $m'$, to form the angles which the end or corner folds make with the side folds. The vertical movement of said corner-knives $p$ is secured by placing the supporting-bracket $p'$ for the knife or knives directly on the bracket $m^4$, as illustrated in Fig. 5. The knives of each matrix will, therefore, have the same vertical movement as the plates $m$ and $m'$, forming the side walls of the matrix. The blade or knife $p$ in outline corresponds to the outline of a portion of the end or the entire end of the blank to be formed.

With reference to Figs. 6, 7, 19, 20, 21, 22, and 23, the longitudinal movement of the corner-knives corresponding to the longitudinal movement of the plates $m$ and $m'$ is accomplished in the following manner: Secured to either end of the frame $b$, and projecting over the face of the bed $b^3$, midway between the matrices A and B, is a slotted arm $p^2$, in the slot $p^3$ of which is adjustably pivoted, by a nut $p^4$, the Y-shaped or forked lever $p^5$. The forks $p^6$ of this lever $p^5$ project downwardly, as illustrated in Figs. 7 and 19, and carry at their ends the corner-knives $p$, which knives are slotted, as at $p^7$, to receive the pin $p^8$, on the ends of the forks $p^6$. The free end $p^9$ of the lever $p^5$ is slotted to a box $p^{10}$, within which oscillates a cam $p^{11}$, secured to the shaft $p^{12}$, as illustrated in Figs. 6, 7, and 21. As clearly appears from inspection of Fig. 21, the cam-box $p^{10}$ engages the slotted end $p^9$ of the lever $p^5$, and may be secured thereto in adjusted position at any point in the slot by means of the clamp-nut and bolt, as shown. This shaft $p^{12}$ receives a rocking or oscillating motion through a sector-gear $p^{13}$, secured on the shaft, the said gear meshing with one end of the pivoted sector $p^{14}$, the other end of said sector $p^{14}$ meshing with the sector-gear $c^5$, secured to the shaft $c$, as illustrated in Figs. 5 and 24. When the shaft $c$ oscillates, as from left to right, the shaft $p^{12}$ is oscillated through the sector and gear from right to left, and the cam-surface $p^{15}$ of the cam $p^{11}$ impinges on the left-hand side of the box $p^{10}$, which is thereby moved from right to left, shifting the free end $p^9$ of the lever $p^5$ from right to left, and thereby through the pin $p^8$ and slot $p^7$ retracting the right-hand corner-knives from the walls of the matrix B, and advancing the left-hand corner-knives toward the walls of the matrix A, substantially as shown in Figs. 4 and 6. Of course, the oscillation of the shaft $c$ from right to left will retract the left-hand corner-knives and advance the right-hand corner-knives. As has been heretofore explained, the carriage $m^2$, carrying the plates $m$ and $m'$, is shifted also in a direction opposite to the direction of movement of the shaft $c$, and therefore the corner-knives and the side walls $m$ and $m'$ are moved inward or outward together.

When blanks of varying lengths are to be folded in the matrices A and B, and the side walls $m$ and $m'$ and the die-plate $k^{10}$ have been lengthened or shortened to a corresponding degree, it is necessary also that the corner-knives $p$ be adjusted accordingly, which is accomplished in the following manner:

With reference to Figs. 6 and 7, it will be seen that the slot in the arm $p^2$, which supports the lever $p^5$, carrying the corner-knives, allows of an adjustment laterally of said lever $p^5$, and the corner-knives $p$ are advanced or retracted toward or from the middle of the machine, when the lever $p^5$ is slid out or back in the slot of the supporting-arm $p^2$. The knife $p$ may also be adjusted to any angle to correspond with the angle formed by the end or corner of the blank with the sides in the following manner by reference to Figs. 19, 20, and 22, in which it will be seen that the knife $p$ has at its upper end an arm $p^{15}$ in the curved slot $p^7$, and at one end of which the pin $p^8$ of the fork $p^6$ of the lever $p^5$ engages. The arm $p^{15}$ slips into a recessed plate $p^{17}$, which plate in turn is secured by set-screws $p^{18}$ to an arm or slide $p^{19}$, adapted to slide on the support $p'$ in a slot thereof. This movement of the slide $p^{19}$ on the support $p'$ is to allow of an adjustment of the recessed plate $p^{17}$, corresponding to the adjustment of the knives through the lever $p^5$ on the arm $p^2$. To turn the knife $p$ to any angle, all that is necessary is to loosen the set-screw $p^{18}$, when the plate $p^{17}$ and knife $p$ may be turned, the pin $p^8$ turning in the curved slot $p^7$ of the arm $p^{15}$ of said knife.

Thus the corner-knife $p$ is and must be fast to the arm $p^{15}$, so that the oscillation of the arm $p^6$ shall be communicated through the pin $p^8$ and curved slot $p^7$ of the arm $p^{15}$ to the corner-knife $p$. In such movement the arm $p^{15}$ slides to and fro in the recessed plate $p^{17}$, the latter serving in effect as a bearing or guide for the arm $p^{15}$, carrying said knife $p$. It will be observed, too, that by means of the arm $p^{19}$ being secured to the supports $p'$, which in turn are made fast to the frames $m^4$, the vertical reciprocation of said frames, which is the only movement they have, is communicated to the arms $p^{19}$, and hence to the corner-knives at the required periods.

It will be understood, therefore, from the foregoing description, that the corner-knives are capable of a vertical movement corresponding to and simultaneous with the vertical movement of the side plates $m$ and $m'$ of the matrices, and moreover, that when said side plates $m$ and $m'$ of either matrix are moved longitudinally toward or from each other the corner or end knives of either matrix have a corresponding movement toward or from each other. Besides these movements which are controlled by the oscillating shaft $c$, there is a hand adjustment for the corner-knives in either matrix, which permits them to be advanced toward the center of the matrix or to be retracted therefrom, to compensate for the decrease or increase in length of the side walls $m$ and $m'$, necessary to form blanks of varying lengths, and a hand adjustment, whereby the angle which a knife $p$ makes with the side walls $m$ and $m'$ may be changed to correspond with the angle that the corner or end of the blank makes with its sides.

With reference now to Figs. 16, 17, and 18, in which there is shown a modification or equivalent for the cam $p^{11}$, and the box $p^{10}$, or device for oscillating the forked lever $p^5$, to operate the corner-knives longitudinally. In this modification the arms $p^6$ are connected by rods (not shown) to suitable rolls $q$, adapted to slide on the throw-surface of a two-throw cam $q'$, in such a manner as that the rods controlling the arms $p^6$ and operated by the rolls are alternately raised and lowered to shift the said lever $p^5$ in or out in the manner hereinbefore described. To provide for an adjustment of the lever $p^5$ with respect to the length of movement thereof, to compensate for the length of the blank to be folded, the cam $q'$ is removably secured to the shaft $p^{12}$ by means of the key $q^2$ and screw $q^3$, so that by unloosening the said screw the key $q^2$ may be withdrawn from the cam and the cam $q$ may be removed from the shaft. Another cam of greater or less throw may then be united to the shaft by said key $q^2$ and screw $q^3$.

Where a two-part collar or cuff is to be formed in the matrix, as for instance, a turn-down collar, in which the body and band are separate, there is provided a device, whereby the points at which the body fits into the band are automatically indicated during the turning down or folding of the side edges. This is accomplished by the device illustrated in Figs. 8, 11, 14, and 15, in which the soapstone base $l$ is hollowed out to receive a slide or plate $l'$, which is secured by bolts or screws $l^2$ to said base $l$. On this slide $l'$ is placed a separable button consisting of the head $l^3$ and shank $l^4$, united by a screw or pin $l^5$, and said button is adapted to be moved on said slide $l'$. The head $l^3$ of the button is provided with a recess $l^6$, adapted to receive a pin $l^7$, projecting from the under surface of the die $k$. The position of the recess $l^6$ may be varied to register with said pin $l^7$ by either sliding the button on the plate $l'$ or turning the button on its axis or by combining both movements. Where a greater range of longitudinal movement of the button on its slide is required, a block or blocks of stone $l^8$ may be removed from the cavity in the base to enlarge said cavity and the slide $l'$ removed and a longer slide substituted.

It will be observed by reference to Figs. 2 and 11 that the frame $b$ is divided into compartments by the downwardly-projecting ribs $b^{11}$ and $b^{13}$, integral with or united to the bed $b^3$. The ribs $b^{11}$ project sufficiently to form the walls for the chambers $b^{12}$, in which the gas-jets $b^6$ are placed to confine in a great measure the heat in said chambers, and at the sides of the machine the ribs $b^{13}$ project still farther down to prevent the escape of gas from the machine. The compartments formed by these ribs communicate below the ribs, and whatever gas or heated air escapes into the frame $b$ from the heating-chambers $b^{12}$ is conveyed away by a pipe $b^{14}$, connected to a suitable exhaust. (Not shown.) The sides $b^{13}$ of the frame $b$, at which the operators stand, are provided at their outer face with a layer of asbestos $j$. This asbestos prevents the operator from coming in contact with the frame $b$, which becomes heated by the transmission of heat from the chambers $b^{12}$. On the outer face of the chambers $b^{12}$ a similar layer of asbestos is placed to prevent the transmission of heat from said chambers.

The layers of asbestos between the dies $m^8$ and $k$ and their respective plates $m$, $m'$, and $k^{10}$ prevent the transmission of heat from said dies to said plates. The insulation of the slabs $l$ from the bed $b^3$ by asbestos likewise serves to retain the heat in the slab $l$ by preventing its transmission to the bed. It will thus be seen that the sides of the frame $b$, the bed $b^3$, except the slabs $l$, and the plates $m$, $m'$, and $k^{10}$ are all protected by asbestos, so that they will not become hot, and hence the operator will not be burned while the machine is in operation and the blanks are being introduced into or removed from the matrices of the machine.

The mode of operation of the machine of my invention as hereinbefore described is as follows: The shaft $c$ is caused to oscillate from left to right, or vice versa, by depressing one of the treadles $d'$ or $e'$, and through its arm $c'$ and connections elevating and depressing alternately the frames $h^3$ and $i^3$, carrying the dies $k$, as hereinbefore explained. At the same time the shaft $c$, during its oscillations through the arm $c^4$, throws the carriage $m^2$ back and forth to cause the walls $m$ and $m'$ to approach or recede. This motion to the walls $m$ and $m^1$ is so timed that while the frame $h^3$ or $i^3$ is descending or ascending, or is stationary in its elevated position, the walls $m$ and $m'$ are separated to their full extent, but when the frame $h^3$ or $i^3$ has reached its lowest position, that is, with the die $k$ resting on the base $l$, and is held there for a certain time, the walls $m$ and $m'$ approach their narrowest extent, the bevel of the dies $m^8$ overlap the bevel $k^5$ of the die $k$, and are then separated to permit of the withdrawal of the die $k$. The shaft $c$ likewise through the sector and sector-gear oscillates the shaft $p^{12}$ in the manner hereinabove explained, and the shaft $p^{12}$, through the connections heretofore described, move the corner-knives simultaneously with the side walls $m$ and $m'$, so that when the walls $m$ and $m'$ are separated the corner-knives are drawn backward to permit the ends of the dies $k$ to enter or be withdrawn from the matrix. The corner-knives are also advanced with the coming together of the walls $m$ and $m'$, and the bevel of the knives overlaps the bevel on the ends of the dies $k$ in like manner as the bevel of the dies $m^8$ of the walls $m$ and $m'$ overlaps the bevel of the sides of the die $k$. The motion conveyed to these walls $m$ and $m'$ is such that when one matrix, for example, B, is closed the other one, A, is opened, and vice versa. Supposing now a collar is to be formed of a shape substantially as outlined in the drawings at B, Figs. 4, 6, and 11, the blank C is first cut to a required shape and then laid between the walls $m$ and $m'$, above the beveled edge of the dies $m^8$, while the walls are separated. The corners D of the blank will rest upon the edge of the corner-knives, which are in their retracted position. A treadle is now depressed, the shaft $c$ is oscillated, and a frame $h^3$ descends. The edge of the die $k$ just passes the edges of the dies $m^8$ and corner-knives $p$, and the sides and corners of the blank will be bent as at E, to a position substantially at right angles to the body of the blank, which is firmly pressed by the die $k$ upon the heated base $l$. The walls $m$ and $m'$ and the knives $p$ are now advanced longitudinally by the carriage $m^2$ and bracket $m^4$ and depressed vertically, and the beveled edges of these walls and knives will thus fold down the portion E of the blank and press it firmly between the bevels of the die $k$ and that of the die $m^8$ and knife $p$. The blank is thus folded upon the die $k$, and is creased into the shape of the die. When the die is elevated, the walls $m$ and $m'$ and knives $p$ are separated, and the folded blank is drawn upward by the die and may be removed therefrom by hand when the die is in its raised position. After the blanks have been removed from the dies $k$, they may be united into a collar substantially as illustrated in Figs. 25 to 30, inclusive. The blanks C, when folded as at E, are placed with their folded portions facing each other and united by a single row of stitching passing through the blanks at the folds, as indicated in the drawings at F. When a gutter-edge collar is to be formed, as illustrated in Fig. 27, both blanks C prior to being placed in the matrix are lined on top with a stiffening G, and the edges and corners of the combined blank C and stiffener G turned in, as illustrated in cross-section in Figs. 26 and 28. When, however, a bead-edge collar is desired, as shown in Fig. 29, one blank only is faced with two stiffeners and the edges and corners of said blank and stiffeners turned in, substantially as indicated in Fig. 30, at one operation by the die $k$ and matrix.

In the drawings, the outline of the knives $p$ is shown to be complemental to the outline of the side dies $m$ and $m'$, so that the combined outline of the side dies and end knives will correspond to the outline of the sides and ends of a completed collar. Where the end of the collar to be folded is substantially irregular, as in Figs. 25, 27, and 29, the outline of the die $p$ will correspond to the outline of the end of said collar.

It will be manifestly obvious that many modifications of the parts of the machine of my invention may be made or equivalents therefor employed without departing from the spirit and scope of the invention, and hence I do not wish to be understood as limiting myself to the precise construction and arrangement of all the parts of the machine as illustrated in the drawings; but,

Having thus described the nature and objects of my invention, what I claim as new, and desire to secure by Letters Patent, is—

1. In a machine for forming, turning, and pressing collars, &c., the combination of the following instrumentalities, viz: two dies; a sectional matrix for each; a main shaft; means to actuate the shaft; connections between the shaft and each die and matrix, the said connections having a dwell or rest whereby, upon actuation of the shaft, one die and its matrix are operated to infold the edges of a blank, alternately with relation to the other die and its matrix, and are maintained in closed-in position for a time to allow the infolded edges of a blank to become set or fixed before said die and matrix can be separated by further actuation of said shaft and connections, substantially as described.

2. In a machine for forming, turning and pressing collars, &c., the combination of the following instrumentalities, viz: a die, a sectional matrix, comprising side knives and corner-knives the latter being relatively movable with relation to the former; a main shaft; means to actuate the shaft; connections between the shaft and die, the shaft and side knives, and the shaft and corner-knives; whereby, upon actuation of said shaft, the relative positions of the die and sectional matrix are changed and the corner-knives operated relatively to the side knives to form the required folds in the blank, substantially as described.

3. In a machine for forming, turning, and pressing collars, &c., the combination of the following instrumentalities, viz: two dies; a sectional matrix for each; a main shaft; means to actuate the shaft; connections between the shaft and each die and matrix whereby, upon actuation of the shaft, one die and its matrix are operated to infold the edges of a blank, alternately with relation to the other die and its matrix; the connections between said main shaft and dies having two oppositely-arranged cams each having a dwell or idle surface, substantially as described.

4. In a machine of the character described, two frames, a die-surface carried by each frame, rods connecting each frame with levers, two oppositely-arranged cams adapted to operate said levers and an oscillating shaft adapted to operate said cams, all arranged so that when said shaft oscillates said cams will alternately operate said levers to periodically raise and lower the connecting rods and frames, substantially as and for the purposes set forth.

5. In a machine of the character described, two frames; a die carried by each frame; a sectional matrix including a pair of corner-knives; a main shaft, with connections between it and the die, matrix and knives and mechanism to actuate said shaft substantially as described.

6. In a machine of the character described, frames provided with removable plates, dies, a movable shaft, cams and connecting-rods arranged so that when said shaft is actuated said cams and rods are adapted to control the position of said frames, substantially as and for the purposes set forth.

7. In a machine of the character described, two frames carrying a series of removable plates provided on their under surface with a die, rods connecting each frame with levers, two oppositely-arranged cams adapted to operate said levers and an oscillating shaft adapted to operate said cams, arranged so that when said shaft oscillates said cams will alternately operate said levers to periodically raise and lower the connecting-rods and said frames, substantially as and for the purposes set forth.

8. In a machine of the character described, a main frame and upwardly-extending brackets provided with grooves or slots, two frames moving vertically in said slots and provided with removable plates, dies carried by said plates and mechanism for alternately raising and lowering said frames, substantially as and for the purposes set forth.

9. In a machine of the character described, a main frame and upwardly-extending brackets thereon provided with grooves or slots, two frames moving vertically in said slots and provided with a series of removable plates, dies carried by said plates and connecting-rods, levers, oppositely-arranged cams and an oscillating shaft, whereby when said shaft is oscillated said frames are vertically movable in said slots alternately through said connecting-rods, parallel levers and cams, substantially as and for the purposes set forth.

10. In a machine for forming, turning and pressing collars, &c., the combination of the following instrumentalities, viz: a die; a sectional matrix; a pair of corner-knives; a main shaft, means to actuate the shaft; connections between the shaft and die to vertically reciprocate the latter upon operation of the former and connections between the shaft and sectional matrix, and between the shaft and corner-knives to actuate said knives relatively to the sectional matrix, whereby upon actuation of said shaft the matrix and corner-knives are vertically and longitudinally reciprocated with relation to each other and to the die, substantially as described.

11. In a machine of the character described, two frames, each provided with a series of removable plates, a die-surface carried by said plates, an oscillating shaft, two oppositely-arranged cams, and connections between said shaft, cams and frames whereby upon oscillation of the shaft motion will be transmitted through said cams to said frames to alternately raise and lower the same, substantially as described.

12. In a machine of the character described, a matrix, the base of which consists of a fixed slab of stone adapted to be heated and provided with a slide and a button guided in said stone, a die adapted to be received in said matrix, and a pin carried by said die and adapted to enter a perforation in the button, substantially as and for the purposes set forth.

13. In a machine of the character described, a vertically-movable die provided with a pin on its under surface a matrix adapted to receive the same, the base of said matrix being fixed and heated and a slide and button in the base of said matrix, said button being adjustable in said slide so that a recess in said button may register with the pin on the under surface of said die, substantially as and for the purposes set forth.

14. In a machine of the character described, a matrix, the base of which is located in the bed-plate of the machine and one of the side walls of said matrix being longitudinally movable over said plate and secured to a carriage traveling on a frame which supports said plate, the other side wall of said matrix being secured to a bracket sliding vertically on the frame of said plate and having a longitudinal movement on said bracket, and an oscillating shaft adapted to shift said carriage and the side wall carried thereby, and said carriage adapted to shift said other side wall in said bracket, whereby when said shaft is oscillated said carriage and the wall carried thereby are shifted in one direction and the other side wall shifted in an opposite direction and the side walls of the matrix adapted to approach or recede from each other, substantially as and for the purposes set forth.

15. In a machine of the character described, a main frame, a body-frame, a bed-plate supported on said body-frame, a carriage adapted to slide on said body-frame and carrying one of the side walls of a matrix, a bracket vertically movable in said body-frame and slotted to receive the other side wall of said matrix, so that said side wall may have a longitudinal movement in said bracket, an oscillating shaft and a trigger adapted to shift said carriage and thereby longitudinally move one of the side walls of said matrix, a trigger interposed between the other of said side walls and the carriage, whereby when said carriage and its side wall are shifted in one direction the other side wall is shifted in said bracket in an opposite direction, substantially as and for the purposes set forth.

16. In a machine of the character described, a main frame, a body-frame supported thereon, a bracket vertically movable in said body-frame, said bracket carrying the side plates or walls of a matrix and the corner-knives thereof, a carriage sliding in said body-frame and means for moving said carriage, whereby the carriage is adapted to longitudinally move the side walls of said matrix toward or from each other and to raise or depress said bracket, substantially as and for the purposes set forth.

17. In a machine of the character described, the combination of an oscillating shaft, a sector-gear secured thereto and a sector-lever meshing at one end with said sector-gear, a second shaft provided with a sector-gear meshing with the other end of said sector-lever and adapted to be oscillated through said sector and gears by said oscillating shaft and with end knives and an arm supporting the same adapted to be shifted by said second shaft, substantially as and for the purposes set forth.

18. In a machine of the character described, an oscillating shaft, two treadles and treadle-rods adapted to oscillate said shaft back and forth, a sector-gear secured to said shaft, and a sector-lever meshing at one end with said sector-gear, a second shaft, a sector-gear secured thereto and meshing with the other end of said sector-lever, a cam and its box operated by said second shaft, a forked lever secured to the cam-box and corner-knives secured to said forked lever, all arranged whereby when said oscillating shaft is actuated through the treadles and treadle-rods said second shaft is oscillated thereby through the sector-gears and sector-lever and said cam on said second shaft operates said box to thereby through said forked lever shift said corner-knives, substantially as and for the purposes set forth.

19. In a machine of the character described, the corner-knife pivoted at one end of an adjustable support and adapted to be moved about said pivot, an arm secured to the other end of said knife and provided with a curved slot, a forked lever engaging the slot of the arm of said knife and adapted to longitudinally shift the same at all positions of said knife with relation to its support, substantially as and for the purposes set forth.

20. In a machine of the character described, the corner-knife, a slotted forked lever pivotally secured at one end to said knife, a cam, cam-box and an oscillating shaft carrying said cam, said cam-box being adjustably secured to the slot of said forked lever at its free end, all arranged so that when said shaft and cam are operated said cam-box is shifted laterally and through the forked lever shifts longitudinally the corner-knife, substantially as and for the purposes set forth.

21. In a machine of the character described, the corner-knife pivotally secured at one end to a slide, said slide being adjustable longitudinally in a support, said knife being adjustable about its pivot in said slide, a forked lever engaging a slot in the other end of said knife, the free end of said forked lever being secured by a slotted connection to a cam-box, a cam and oscillating shaft adapted to shift said cam-box, all arranged so that said forked lever may be adjusted longitudinally with respect to the cam-box and the knife radially with respect to its support and said knife through said forked lever adapted to be moved longitudinally when said cam-box is shifted by said cam and oscillating shaft, substantially as and for the purposes set forth.

22. In a machine of the character described, the combination of an oscillating shaft and its supporting-frame, a cam having an idle and a throw surface and pivoted to said support at its idle end, a second cam having an idle and a throw surface and pivoted to said support at its idle end, said cams being arranged parallel to each other and having their throw and idle surfaces oppositely arranged, an arm oscillating with said shaft and carrying a pin engaging the throw and idle surfaces of said cams, all arranged so that when said shaft is oscillating, its arm and pin alternately raise and lower either of said cams, substantially as and for the purposes set forth.

23. In a machine of the character described, a shaft, an arm secured thereto and two parallel oppositely-arranged pivoted cams each provided with a slot in which the arm of said shaft is secured, whereby when said shaft and its arm oscillate or rock, the cams are alternately raised and lowered to transform the oscillating motion into a parallel alternate up-and-down motion, sustantially as and for the purposes set forth.

24. In a machine of the character described, an oscillating shaft, an arm secured thereto and two oppositely-arranged parallel pivoted cams, each provided with a slot constituting an idle and a throw surface for each of said cams, the arm of said shaft engaging said slots, whereby during one movement of said shaft one cam is alternately idle and thrown and the other cam alternately thrown and idle, and the oscillating movement of said shaft is converted into periodic vertical and parallel movements, substantially as and for the purposes set forth.

25. In a machine of the character described, an oscillating shaft, an arm secured thereto, two oppositely-arranged parallel counterpoised and pivoted cams, each provided with a slot constituting the throw and idle surface of each cam, two parallel levers each pivotally secured to a cam and moving therewith and a connection between the arm of the oscillating shaft and the slot of each cam, all arranged so that during one movement of said shaft, one cam and its lever are alternately idle and thrown, and the other cam and lever alternately thrown and idle, so that the oscillating movement of said shaft may be converted into a periodic, vertical and opposite movement to said levers, substantially as and for the purposes set forth.

26. In a machine of the character described, an oscillating shaft, an arm secured thereto, two oppositely-arranged parallel, counterpoised and pivoted cams, each provided with a slot constituting an alternate idle and throw surface for each cam, two counterpoised parallel levers, each pivotally secured to the throw end of one cam and moving therewith and pivoted on the pivotal support of the other cam and said arm of said shaft secured in the slot of each cam, all arranged so that during one movement of said shaft one cam and its lever are alternately idle and thrown and the other cam and its lever alternately thrown and idle, so that the oscillating movement of said shaft may be converted into a periodic, vertical and opposite movement of said parallel levers, substantially as and for the purposes set forth.

27. In a machine of the character described, a matrix, the base of which is provided with a button; means to adjust the button in said base; a die adapted to be received in said matrix; and a pin carried by said die and adapted to register with said button in combination, substantially as and for the purpose set forth.

28. In a machine of the character described, a plurality of pressers, means for imparting movement thereto in a rectilinear direction, a bed, a knife intermediate said pressers, means for imparting lateral movement to said knife, side knives and end knives and means for actuating the same.

In testimony whereof I have hereunto set my signature in the presence of two subscribing witnesses.

ALBERT D. FENWICK.

Witnesses:
RICHARD C. MAXWELL,
THOMAS M. SMITH.